US012038728B2

(12) United States Patent
Sayyarodsari et al.

(10) Patent No.: US 12,038,728 B2
(45) Date of Patent: Jul. 16, 2024

(54) AUTOMATED EMBEDDED TUNING OF MODEL-LESS CONTROLLERS

(71) Applicant: ROCKWELL AUTOMATION TECHNOLOGIES, INC., Mayfield Heights, OH (US)

(72) Inventors: Bijan Sayyarodsari, Austin, TX (US); Hanyu Shi, Austin, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 134 days.

(21) Appl. No.: 17/483,335

(22) Filed: Sep. 23, 2021

(65) Prior Publication Data

US 2023/0092851 A1  Mar. 23, 2023

(51) Int. Cl.
*G05B 13/04* (2006.01)
(52) U.S. Cl.
CPC .................. *G05B 13/042* (2013.01)
(58) Field of Classification Search
CPC ........ G05B 13/042; G05B 2219/42134; G05B 11/42; G05B 13/0265; G05B 13/024
See application file for complete search history.

(56) References Cited

U.S. PATENT DOCUMENTS

| | | | |
|---|---|---|---|
| 9,292,010 B2 | 3/2016 | Sayyarrodsari et al. | |
| 10,620,604 B2 | 4/2020 | Sayyarrodsari et al. | |
| 2005/0149209 A1* | 7/2005 | Wojsznis | ............. G05B 13/048 700/52 |
| 2012/0323367 A1* | 12/2012 | MacArthur | .......... G05B 13/048 700/267 |
| 2016/0170393 A1* | 6/2016 | Sayyarrodsari | ...... G05B 13/042 700/32 |
| 2020/0391037 A1* | 12/2020 | Grado | ................ A61N 1/36132 |

(Continued)

FOREIGN PATENT DOCUMENTS

| | | |
|---|---|---|
| WO | 9312476 A1 | 6/1993 |
| WO | 2020253926 A1 | 12/2020 |

OTHER PUBLICATIONS

Control Station, "Loop-Pro, PID Loop Tuning Technology" Jul. 6, 2020, 4 pages, https://controlstation.com/pid-loop-tuning/, last accessed Sep. 30, 2021.

(Continued)

*Primary Examiner* — Christopher E. Everett
*Assistant Examiner* — Tameem D Siddiquee
(74) *Attorney, Agent, or Firm* — Fletcher Yoder, P.C.

(57) ABSTRACT

A method may include receiving data representative of one or more commands generated by a model-less controller to control operations of devices within a system and output parameters associated with the devices of the system. The method may also include determining whether the data is indicative of a change in operational characteristics of the system and generating a model representative of the operational characteristics of the system as a function of the data based on a Bayesian optimization algorithm in response to the data being indicative of the change. The method may also involve transmitting an excitation input to the devices in response to the data not being indicative of the change, receiving updated output parameters associated with the devices of the system after the excitation input is transmitted, and generating the model based on the updated output parameters and the excitation input.

17 Claims, 6 Drawing Sheets

(56) References Cited

U.S. PATENT DOCUMENTS

2021/0323578 A1* 10/2021 Wang .................. G06F 17/18
2022/0335179 A1* 10/2022 Chakrabarty ............ F24F 11/49

OTHER PUBLICATIONS

Mathworks, "What Is PID Tuning?" Dec. 24, 2012, 2 pages, https://www.mathworks.com/discovery/pid-tuning.html/, last accessed Sep. 30, 2021.
Boyd, Stephen et al. "MIMO PID tuning via iterated LMI restriction", Report No. LiTH-ISY-R-2021, International Journal of Robust and Nonlinear Control, John Wiley & Sons, Ltd, Jun. 25, 2015, 14 pages, Int. J. Robust Nonlinear Control 2016; 26:1718-1731.
"Closed-loop Identification Revisited", Urban Forssell and Lennart Ljung, Department of Electrical Engineering, Linkoping University, Apr. 21, 1998, 55 Pages, Linkoping, Sweden.
Extended European Search Report for Application No. 22195344.1 mailed Jan. 30, 2023, 13 pages.
Thil, Stephane et al., "A Bayesian Approach to Closed-Loop System Identification," 5th IFAC Symposium of Modelling and Control in Biomedical Systems, Melbourne, Australia, vol. 38, No. 1, Jan. 1, 2005, 6 pages.
Minchala-Avila Luis I. et al., "Comparison of the performance and energy consumption index of model-based controllers," 2016 IEEE Ecuador Technical Chapters Meeting, vol. 1, Oct. 12, 2016, 6 pages.
Blazic S. et al., "Online fuzzy identification for an intelligent controller based on a simple platform," Engineering Applications of Artificial Intelligence, Pineridge Press, Swansea, GB, vol. 22, No. 4-5, Jun. 2009, 11 pages.
Astrom et al., "System identification: a survey," Jan. 1, 1970, https://research.tue.nl/files/4430789/355063.pdf, retrieved from the Internet Jan. 18, 2023, 40 pages.

* cited by examiner

AUTOMATED EMBEDDED TUNING OF MODEL-LESS CONTROLLERS

BACKGROUND

The present disclosure generally relates to control systems and, more particularly, to control systems that control operations industrial automation environments with electromechanical machinery, production lines, conveyer systems, and the like. More specifically, the present disclosure is related to improving the performance of model-less controllers that are employed by the control systems listed above.

Generally, a control system may facilitate performance of an industrial automation process by controlling operation of one or more automation devices. For example, to facilitate performing an industrial automation process, the control system may determine a control action and instruct an automation device (e.g., a rod-pump) to perform the control action. Additionally, the control system may monitor performance of the process to determine whether the process is operating as desired. When not operating as desired, the control system may also perform diagnostic operations on the process to determine potential causes of the undesired operation.

Model-based optimization and control has received increasingly more attention both in academia and in industry over the past few decades. This is due at least in part to their success in the process industry. However, model-less strategies, such as proportional-integral-derivative (PID) controllers, are still very pervasive in industrial applications. Other model-less control strategies, such as expert systems, fuzzy logic controllers, and so forth, are also used in some industrial applications. The performance of most model-less controllers can be improved by proper adjustments to certain coefficients (or other equivalent parametrizations) of the control algorithm implemented by these model-less controllers. As such, improved systems and methods for dynamically tuning model-less control strategies may enable industrial automation systems to operate more efficiently.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method may include receiving data representative of: one or more commands generated by a model-less controller to control one or more operations of one or more devices within a system and one or more output parameters associated with the one or more devices of the system. The method may also include determining whether the data is indicative of a change in one or more operational characteristics of the system and generating a model representative of the one or more operational characteristics of the system as a function of the data based on a Bayesian optimization algorithm in response to the data being indicative of the change. The method may also involve transmitting an excitation input to the one or more devices in response to the data not being indicative of the change, receiving one or more updated output parameters associated with the one or more devices of the system after the excitation input is transmitted, and generating the model based on the one or more updated output parameters and the excitation input.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
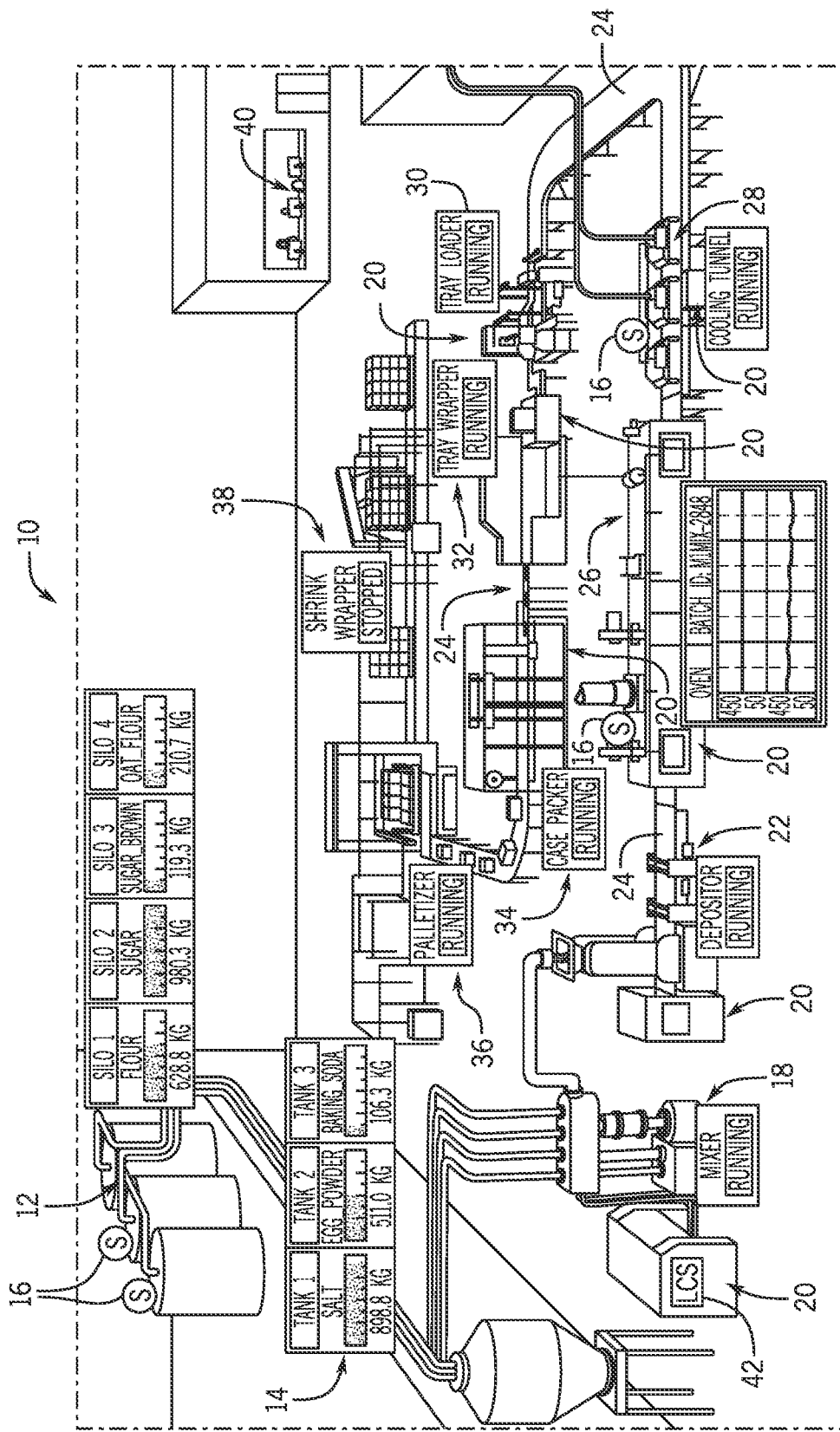
FIG. 1 illustrates an example industrial automation system employed by a food manufacturer, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As discussed above, embodiments of the present disclosure are directed toward systems and methods for automatically and continuously tuning parameters related to the performance of model-less control strategies, such as proportional-integral-derivative (PID) controllers, to enable improved (e.g., ideally optimized) performance of the controller in response to changes in operating condition of a connected system or system behavior (e.g., aging) and enhance controller robustness when the process experiences disturbances. As described above, model-less control strategies, such as PID controllers, have become ubiquitous in industrial control applications. Such controllers have proven to be fairly robust yet relatively simple in operation. However, due at least in part to the relative simplicity of design, such controllers exhibit certain inherent shortcomings, such as an inability to account for potential future responses of the system being controlled.

In contrast, model-based optimization strategies, such as model predictive control (MPC) techniques, are particularly well-suited for incorporating predictive information of the system being controlled. However, model-based solutions are relatively complex as compared to model-less solutions and are generally more computationally intensive. Moreover, model-based solutions involve expert practitioner input that may include modifying operations of the monitored systems using planned or step tests. That is, practitioners may use a step testing procedure in an open loop control method to cause a response in the process implemented by the system. The response of the system and the related monitored data (e.g., acquired sensor data, system response) may generate a suitable dataset that may be used to model the process. In order for the process to be modeled effectively, the step test may involve purposeful changes in process manipulated variables of the model-less controller and observing the impact of the changes on target variables output or measured from the system.

These changes often move the process implemented by the system away from desired operating conditions for production, thereby reducing the efficiency of the system. Moreover, in complex systems, step tests that adjust one or less than some threshold of variables may not cause any impact or change to the process being implemented by the system. That is, a step test for more complex systems become more onerous for multi-input multi-output (MIMO) systems with coupled dynamics in which the various inputs have dynamic and non-linear affects to the overall system. For such systems, a meaningful or insightful step test may account for interacting process behavior of multiple various, which may complicate the step test procedures.

With this in mind, the presently disclosed embodiments provide improved systems and methods for generating an initial model for dynamically tuning parameters of a model-less controller based on a steady state (e.g., normal) operation of the system controlled by the model-less controller. In other words, the present embodiments include a tuning component that may generate a model related to the operation of the system implementing a process to be a function of data collected from the process as the system operates according to its automated (e.g., control logic) manner. That is, the tuning component may include a self-learning capability that allows it to create a model of the process based on the operating conditions of the system implanting the system, while the system operates. In this way, the present embodiments may avoid implementing a step test that may rely on random changes to process manipulated variables to produce some change to the operation of the system even if the change may cause the system to operate less efficiently.

In brief, the tuning component may implement a two-prong approach to generating the initial model based on normal operation data of the monitored system. Namely, the tuning component may (a) make maximal use of normal operation data of the system by analyzing the information content of the collected data online (e.g., in real time); and may (b) induce minimal excitations to enrich the information content of the data while allowing the system to stay within acceptable bounds operations to minimize efficiency reductions related to production. It should be noted that the tuning component described herein may perform both prongs automatically in real time by using a Bayesian optimization algorithm to determine identify variables that may be used to provide targeted excitation to the system. Additional details with regard to efficiently monitoring audio data to perform diagnostic operations in real time using sensor devices will be described below with reference to FIGS. 1-7.

By way of introduction, FIG. 1 illustrates an example industrial automation system 10 employed by a food manufacturer. The present embodiments described herein may be implemented using the various devices illustrated in the industrial automation system 10 described below. However, it should be noted that although the example industrial automation system 10 of FIG. 1 is directed at a food manufacturer, the present embodiments described herein may be employed within any suitable industry, such as process, refining, automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like. In addition, the sensors 16 may measure or acquire image data, audio data, and other suitable ambient characteristics surrounding the industrial automation system 10.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20.

With the foregoing in mind, the supervisory control system 40, the local control system 42, and other suitable control systems may employ model-less controllers to coordinate the operation for the industrial automation devices 20 (e.g., electromechanical machinery, production lines, conveyer systems). For instance, in certain embodiments, model-less controllers, such as PID controllers, may control operations of single industrial automation device 20 (e.g., machine) or a collection of industrial automation devices 20 (e.g., line) to cause the industrial automation device(s) 20 to modify operations based on detected changes to the operating environment, the industrial automation device(s), process variables associated with the industrial automation system 10, and the like.

Figure 2:
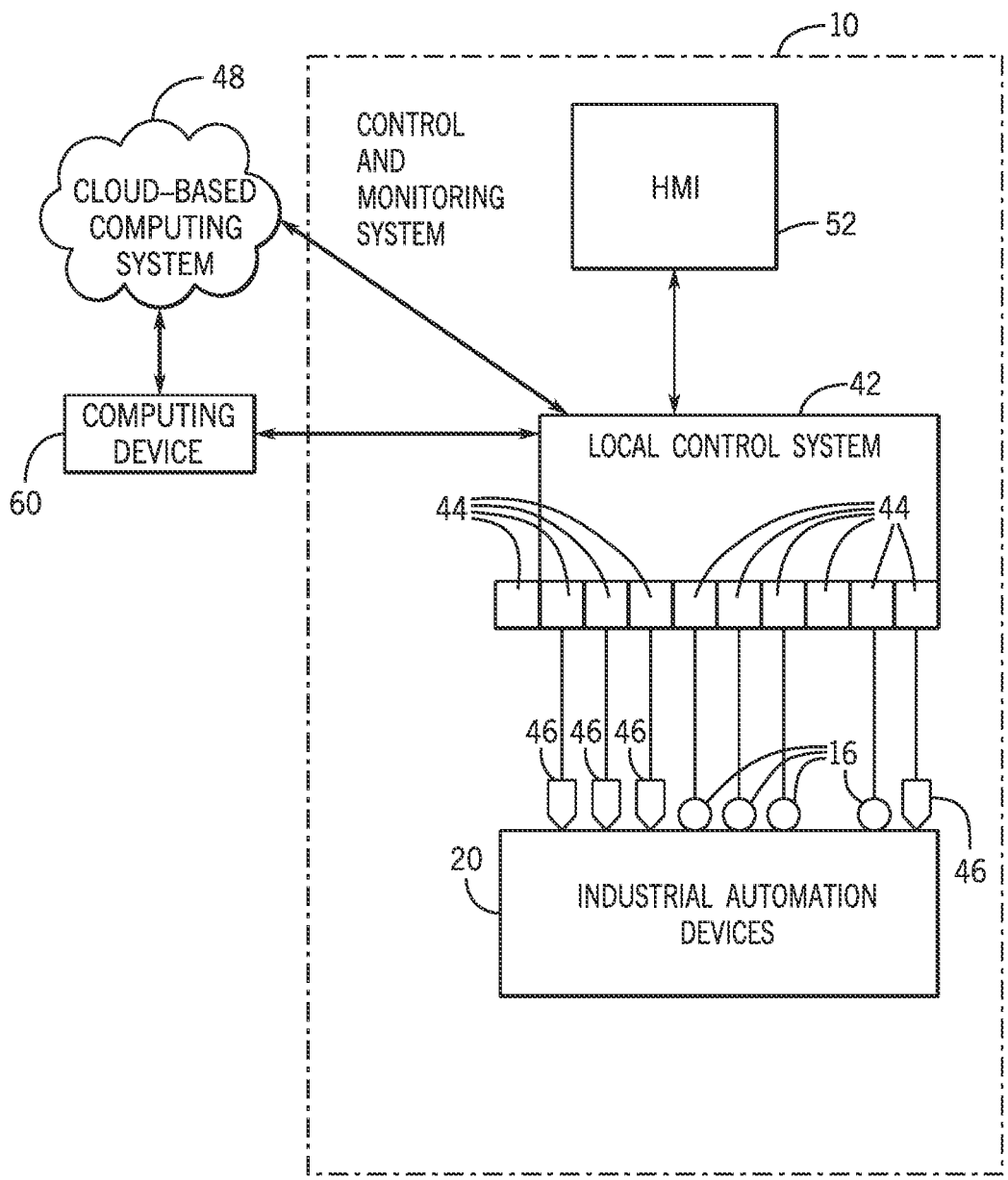
FIG. 2 illustrates a diagrammatical representation of an exemplary control and monitoring system that may be employed in any suitable industrial automation system, in accordance with an embodiment.

By way of example, FIG. 2 illustrates a diagrammatical representation of an exemplary local control system 42 that may be employed in any suitable industrial automation system 10, in accordance with embodiments presented herein. In FIG. 2, the local control system 42 is illustrated being communicatively coupled to a human machine interface (HMI) 52. The local control system 42 may include a control/monitoring device or automation controller adapted to interface with the industrial automation devices 20 or other components that may monitor and control various types of the industrial automation devices 20. By way of example, the industrial automation devices 20 (industrial automation equipment) may include the mixer 18, the depositor 22, the conveyor 24, the oven 26, other pieces of machinery described in FIG. 1, or any other suitable equipment.

It should be noted that the local control system 42, the supervisory control system 40, or any other suitable processing component, in accordance with embodiments of the present techniques, may communicate with other components via certain network strategies. Indeed, any suitable industry standard network or network may be employed, such as DeviceNet, to enable data transfer. Such networks permit the exchange of data in accordance with a predefined protocol and may provide power for operation of networked elements.

In certain embodiments, the local control system 42 may include a communication component that enables the industrial automation devices 20 to communicate data between each other and other devices. The communication component may include a network interface that may enable the industrial automation equipment 50 to communicate via various protocols such as Ethernet/IP®, ControlNet®, DeviceNet®, or any other industrial communication network protocol. Alternatively, the communication component may enable the industrial automation devices 20 to communicate via various wired or wireless communication protocols, such as Wi-Fi, mobile telecommunications technology (e.g., 2G, 3G, 4G, LTE, 5G), Bluetooth®, near-field communications technology, and the like.

As discussed above, the industrial automation devices 20 may take many forms and include devices for accomplishing many different and varied purposes. For example, the industrial automation devices 20 may include machinery used to perform various operations in a compressor station, an oil refinery, a batch operation for making food items, a mechanized assembly line, and so forth. Accordingly, the industrial automation devices 20 may include a variety of operational components, such as electric motors, valves, actuators, temperature elements, pressure sensors, or a myriad of machinery or devices used for manufacturing, processing, material handling, and other applications.

Additionally, the industrial automation devices 20 may include various types of equipment that may be used to perform the various operations that may be part of an industrial application. For instance, the industrial automation devices 20 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation devices 20, which may include controllers, input/output (I/O) modules, motor control centers, motors, human machine interfaces (HMIs), operator interfaces, contactors, starters, sensors 16, actuators, drives, relays, protection devices, switchgear, compressors, firewall, network switches (e.g., Ethernet switches, modular-managed, fixed-managed, service-router, industrial, unmanaged, etc.), and the like.

In some cases, the industrial automation devices 20 may be associated with devices used by other equipment. For instance, scanners, gauges, valves, flow meters, and the like may be disposed on the industrial automation devices 20. Here, the industrial automation devices 20 may receive data from the associated devices and use the data to perform their respective operations more efficiently. For example, a controller of a motor drive may receive data regarding a temperature of a connected motor and may adjust operations of the motor drive based on the data.

Input/output (I/O) modules 44 may be added or removed from the local control system 42 via expansion slots, bays, or other suitable mechanisms. In certain embodiments, the I/O modules 44 may be included to add functionality to the local control system 42, or to accommodate additional process features. For instance, the I/O modules 44 may communicate with new sensors 16 or actuators 46 added to local control system 42. It should be noted that the I/O modules 44 may communicate directly to sensors 16 or actuators 46 through hardwired connections or may communicate through wired or wireless sensor networks, such as Hart or IOLink.

Generally, the I/O modules 44 serve as an electrical interface to the local control system 42 and may be located proximate or remote from a control/monitoring device coupled to the industrial automation device 20, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE702.3, TCP/IP, UDP, Ethernet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 44 may transfer input and output signals between the local control system 42 and the industrial automation devices 20. As illustrated, the sensors 16 and actuators 46 may communicate with the local control system 42 via one or more of the I/O modules 44.

In certain embodiments, one or more properties of the industrial automation devices 20 may be monitored and controlled by certain equipment for regulating control variables used to operate the industrial automation devices 20. For example, the sensors 16 may monitor various properties of the industrial automation devices 20 and may provide data to the local control system 42, which may adjust operations of the industrial automation equipment 50, respectively.

The sensors 16 may be any number of devices adapted to provide information regarding process conditions. The actuators 46 may include any number of devices adapted to perform a mechanical action in response to a signal from a controller (e.g., the local control system 42). The sensors 16 and actuators 46 may be utilized to operate the industrial automation devices 20. Indeed, they may be utilized within process loops that are monitored and controlled by the local control system 42. Such a process loop may be activated based on process input data (e.g., input from a sensor 16) or direct operator input received through the HMI 52.

In certain embodiments, the industrial automation system 10 may make up an industrial automation application that may involve any type of industrial process or system used to manufacture, produce, process, or package various types of items. For example, the industrial applications may include industries such as material handling, packaging industries, manufacturing, processing, batch processing, the example industrial automation system 10 of FIG. 1, and the like.

In certain embodiments, the local control system 42 may be communicatively coupled to a computing device 60 and a cloud-based computing system 48. In this network, input and output signals generated from the local control system 42 may be communicated between the computing device 60 and the cloud-based computing system 48. Although the local control system 42 may be capable of communicating with the computing device 60 and the cloud-based computing system 48, as mentioned above, in certain embodiments, local control system 42 may perform certain operations and analysis without sending data to the computing device 60 or the cloud-based computing system 48.

In operation, the industrial automation system 10 may receive one or more inputs used to produce one or more outputs. For example, the inputs may include feedstock, electrical energy, fuel, parts, assemblies, sub-assemblies, operational parameters (e.g., sensor measurements), or any combination thereof. Additionally, the outputs may include finished products, semi-finished products, assemblies, manufacturing products, by products, or any combination thereof.

To produce the one or more outputs used to control the industrial automation devices 20, the local control system 42 may output control signals to instruct industrial automation devices 20 to perform a control action by implementing manipulated variable set points. For example, the local control system 42 may instruct a motor (e.g., an automation device 20) to implement a control action by actuating at a particular operating speed (e.g., a manipulated variable set point).

In some embodiments, the local control system 42 may determine the manipulated variable set points based at least in part on process data. As described above, the process data may be indicative of operation of the industrial automation device 20 and the like. As such, the process data may include operational parameters of the industrial automation device 20. For example, the operational parameters may include any suitable type, such as temperature, flow rate, electrical power, and the like.

Thus, the local control system 42 may receive process data from one or more of the industrial automation devices 20, the sensors 16, or the like. In some embodiments, the sensor 16 may determine an operational parameter and communicate a measurement signal indicating the operational parameter to the local control system 42. For example, a temperature sensor may measure temperature of a motor (e.g., an automation device 20) and transmit a measurement signal indicating the measured temperature to the local control system 42. The local control system 42 may then analyze the process data to monitor performance of the industrial automation application (e.g., determine an expected operational state) and/or perform diagnostics on the industrial automation application.

To facilitate controlling operation and/or performing other functions, the local control system 42 may include one or more controllers, such as one or more model predictive control (MPC) controllers, one or more model-less controllers, such as one or more proportional-integral-derivative (PID) controllers, one or more neural network controllers, or one or more fuzzy logic controllers, or both.

In some embodiments, the supervisory control system 40 may provide centralized control over operation of the industrial automation application. For example, the supervisory control system 40 may enable centralized communication with a user (e.g., operator). To facilitate, the supervisory control system 40 may include the display 86 to facilitate providing information to the user. For example, the display 86 may display visual representations of information, such as process data, selected features, expected operational parameters, and/or relationships there between. Additionally, the supervisory control system 40 may include other components as described below On the other hand, the local control system 42 may provide localized control over a portion of the industrial automation application. For example, in the depicted embodiment of FIG. 1, the local control system 42 that may be part of the mixer 18 may include the local control system 42, which may provide control over operation of a first automation device 20 that controls the mixer 18, while a second local control system 42 may provide control over operation of a second automation device 20 that controls the operation of the depositor 22.

In some embodiments, the local control system 42 may control operation of a portion of the industrial automation application based at least in part on the control strategy determined by the supervisory control system 40. Additionally, the supervisory control system 40 may determine the control strategy based at least in part on process data determined by the local control system 42. Thus, to implement the control strategy, the supervisory control system 40 and the local control systems 42 may be communicatively coupled via a network, which may be any suitable type, such as an Ethernet/IP network, a ControlNet network, a DeviceNet network, a Data Highway Plus network, a Remote I/O network, a Foundation Fieldbus network, a Serial, DH-485 network, a SynchLink network, or any combination thereof.

Figure 3:
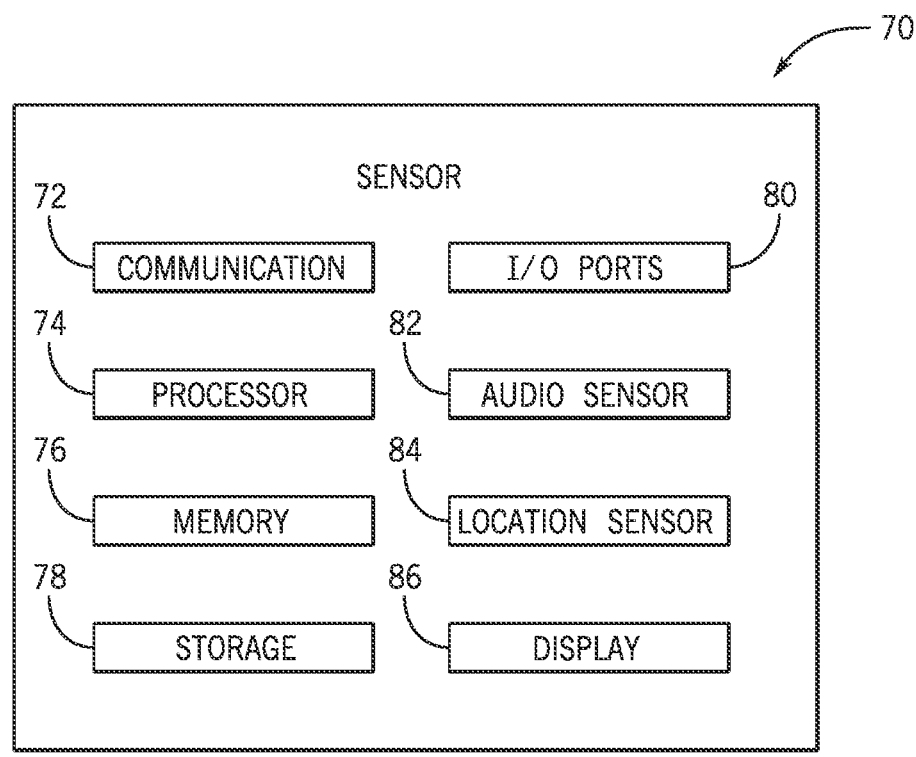
FIG. 3 illustrates example components that may be part of a control/monitoring device in a control system for the industrial automation system, in accordance with an embodiment.

In some embodiments, the sensors 16 may include various types of sensors for detecting various types of data. By way of example, the sensors 16 described herein may include audio sensors that detect acoustic or sound waves. FIG. 3 illustrates example components that may be part of the sensor 16. However, it should be noted that the local control system 42, the supervisor control system 40, or any other suitable computing device may include the components described as being part of the sensor 16. Referring to FIG. 3, the sensor 16 may include a communication component 72, a processor 74, a memory 76, a storage 78, input/output (I/O) ports 80, an audio sensor 82 (e.g., a microphone), a location sensor 84, a display 86, additional sensors (e.g., vibration sensors, temperature sensors), and the like. The communication component 72 may be a wireless or wired communication component that may facilitate communication between the industrial automation devices 20, the cloud-based computing system 48, and other communication capable devices.

The processor 74 may be any type of computer processor or microprocessor capable of executing computer-executable code. The processor 74 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 74 may execute software applications that include programs that enable a user to track and/or monitor operations of the industrial automation devices 20 via a local or remote communication link.

The memory 76 and the storage 78 may also be used to store the data, analysis of the data, the software applications, and the like. The memory 76 and the storage 78 may represent non-transitory computer-readable media (e.g., any suitable form of memory or storage) that may store the processor-executable code used by the processor 74 to perform various techniques described herein. It should be noted that non-transitory merely indicates that the media is tangible and not a signal.

In one embodiment, the memory 76 and/or storage 78 may include a software application that may be executed by the processor 74 and may be used to monitor, control, access, or view one of the industrial automation devices 20. As such, the sensor 16 may communicatively couple to the industrial automation devices 20 or to a respective computing device via a direct connection between the devices or via the cloud-based computing system 48. The software application may perform various functionalities, such as track statistics of the industrial automation devices 20, determine operating states for the industrial automation devices 20, determine whether industrial automation devices 20 are operating in an anomalous state, and so forth.

The I/O ports 80 may be interfaces that may couple to other peripheral components such as input devices (e.g., keyboard, mouse), sensors, input/output (I/O) modules, and the like. I/O modules may also enable the sensor 16 to interface with the computing device 60 or other control/monitoring devices to communicate with the industrial automation devices 20 or other devices in the industrial automation system via the I/O modules 44.

The audio sensor 82 may include any suitable acoustic acquisition circuitry such as a microphone capable of acquiring sound waves, acoustic signals, or the like. The location sensor 84 may include circuitry designed to determine a physical location of the sensor 16. In one embodiment, the location sensor 84 may include a global positioning system (GPS) sensor that acquires GPS coordinates for the sensor 16.

The display 86 may depict visualizations associated with software or executable code being processed by the processor 74. In one embodiment, the display 86 may be a touch display capable of receiving inputs (e.g., parameter data for operating the industrial automation equipment 50) from a user. As such, the display 86 may serve as a user interface to communicate with the sensor 16. The display 86 may display a graphical user interface (GUI) for operating the sensor 16. The display 86 may be any suitable type of display, such as a liquid crystal display (LCD), plasma display, or an organic light emitting diode (OLED) display, for example.

Although the components described above have been discussed with regard to the sensor 16 and the local control system 42, it should be noted that similar components may make up other computing devices described herein. Further, it should be noted that the listed components are provided as example components and the embodiments described herein are not to be limited to the components described with reference to FIG. 3.

Figure 4:
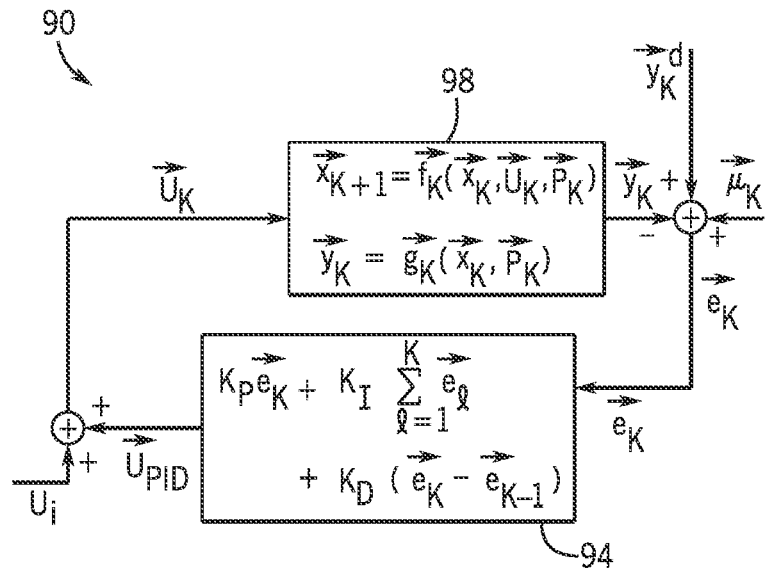
FIG. 4 is a schematic diagram of a control system that includes a position PID controller that may be augmented with a model predictive control (MPC) controller, in accordance with an embodiment.
Figure 5:
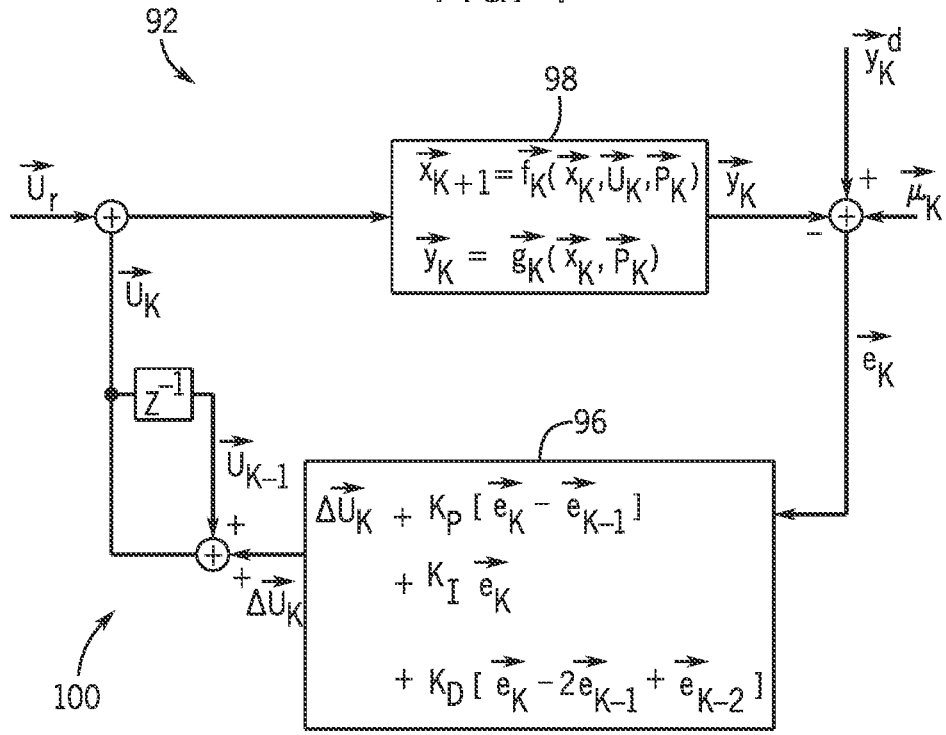
FIG. 5 is a schematic diagram of a control system that includes a velocity PID controller that may be augmented with the MPC controller, in accordance with an embodiment.

By way of example, the local control system 42 may include control systems 90 and 92 as depicted in FIGS. 4 and 5. That is, FIGS. 4 and 5 include schematic diagrams of PID controllers 94, 96, illustrating example operations of such model-less controllers. In particular, FIG. 4 is a schematic diagram of a position PID controller 94, and FIG. 5 is a schematic diagram of a velocity PID controller 96, each of which may be augmented with based on analysis of normal operations and minimal excitations input into the control system as will be discussed in greater detail below. As illustrated in FIG. 4, an input vector is received by a system 98 under control, where the system 98 being controlled is defined using the following equations (i.e., model):

$$\bar{x}_{k+1} = f_k(\bar{x}_k, \bar{\mu}_k, \bar{p}_j) \quad (1)$$

$$\bar{y}_k = g_k(\bar{x}_k, \bar{p}_k) \quad (2)$$

where $\bar{x}_k$ is the state vector, $\bar{p}_k$ is the parameter vector, and $\bar{y}_k$ is the output vector. The output error vector $\bar{e}_k$ between the output vector $\bar{y}_k$ of the system 98 and the determined output vector $\bar{e}_k$ (which may include measurements from the system being controlled; $\bar{\mu}_k$ being measurement noise) is received by the position PID controller 94, which adjusts $\bar{\mu}_{PID}$ according to:

$$K_P \vec{e}_k + K_I \sum_{l=1}^{k} \vec{e}_l + K_D(\vec{e}_k - \vec{e}_{k-1}) \quad (3)$$

where $K_p$, $K_I$, and $K_D$ are matrix coefficients relating to proportional, integral, and derivative constraints, respectively. The velocity PID controller 96 illustrated in FIG. 5 is similar to the position PID controller 94 illustrated in FIG. 4. However, the velocity PID controller 96 determines $\Delta\bar{\mu}_k$ as follows:

$$\Delta\bar{\mu}_k = K_p[\bar{e}_k - \bar{e}_{k-1}] + k_I \bar{e}_k + K_D[\bar{e}_k - 2\bar{e}_{k-1} + \bar{e}_{k-2}] \quad (4)$$

and a control loop 100 determines $\bar{\mu}_k$ based on $\Delta\bar{\mu}_k$ using previous values $\bar{\mu}_{k-1}$ as illustrated in FIG. 5, and $\bar{\mu}_k$ is compared to a reference $\bar{\mu}_r$ to determine the input to the system 98. In conventional systems, there has been no systematic methodology for automatically building reliable models for systematic tuning of coefficients $K_p$, $K_I$, and $K_D$ of PID controllers.

It should be noted that the PID controllers 94, 96 illustrated in FIGS. 4 and 5 are merely exemplary of the types of PID controllers 94, 96 that may be used. Any type of arrangement in which a function (linear, polynomial, non-linear, and so forth) of output error $\bar{e}_k$, (filtered) derivative of the output error $\bar{e}_k$, and integral of the output error $\bar{e}_k$ is used to define a control input $\bar{\mu}_k$ will benefit from the techniques described herein. Any state for which the error signal can be computed may be represented as an output by proper augmentation of the output vector $\bar{y}_k$.

By way of operation, a set-point may be based on a reference value, and the set-point may be compared to an output of the system 18 being controlled to generate an input to the PID controller 94, 96. The PID controller 94, 96, in turn, generates an input for control of the system 98. Furthermore, the output of the system 98 is used by the PID controller 94, 96 to adjust control commands to cause the system 98 to achieve the set-point.

With the foregoing in mind, techniques for combining the features of PID controllers (e.g., speed of operation) with the features of MPC control techniques (e.g., robust predictive capabilities) for the purpose of increasing performance without introducing the drawbacks typically associated with either PID strategies (e.g., lack of predictive capabilities) or MPC strategies (e.g., complexity and relatively low level of responsiveness) are detailed in U.S. Pat. Nos. 9,292,010; 10,620,604, both of which are incorporated herein. The embodiments presented herein are related to generating the initial model that may be used with MPC control techniques.

Figure 6:
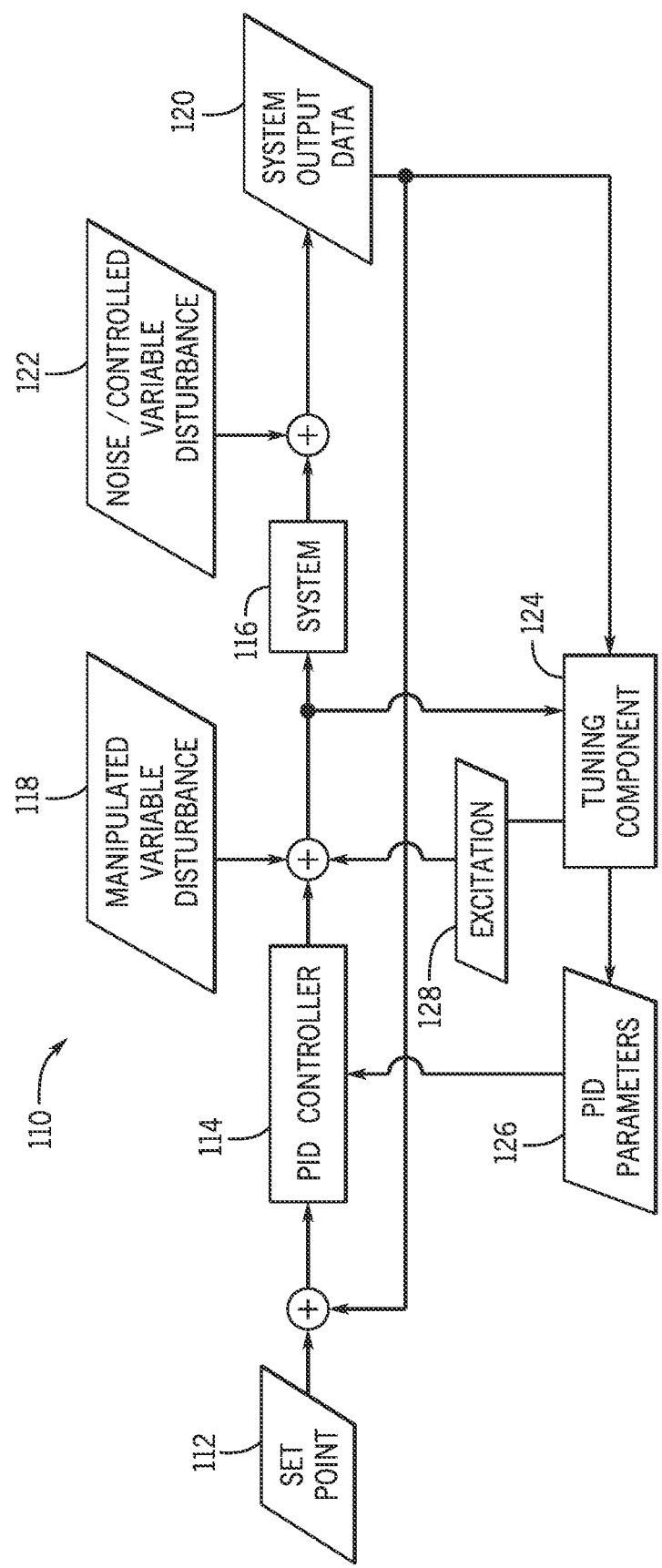
FIG. 6 illustrates a control system block diagram that includes a tuning component for tuning parameters of a PID controller, in accordance with an embodiment.

FIG. 6 illustrates a block diagram that illustrates a tuning system 110 that may be implemented using embodiments described herein. Before continuing, it should be noted that the tuning system 110 is described with a particular model-less controller, certain manipulated variables, certain control variables, certain noise elements, and the like. However, these items are merely provided as example inputs to the tuning system 110 and the tuning system 110 may receive other suitable inputs that may affect the operations of the tuning system 110.

Referring now to FIG. 6, a set point 112 may be provided to a PID controller 114 similar to the set point or reference described above with reference to FIGS. 4 and 5. The PID controller 114 may correspond to the PID controller 94 described above. In addition, the PID controller 114 may be replaced with any suitable model-less controller.

The PID controller 114 may provide commands to a system 116 to control process outputs of the system 116. The commands may be provided to one or more industrial automation devices 20 or other suitable components. The system 116 may correspond to any suitable system, device, or collection of devices that may be controlled by the PID controller 114. As such, the system 116 may correspond to the industrial automation system 10 described above.

In addition to the commands received from the PID controller 114, the system 116 may receive manipulated variable disturbance data 118, which may correspond to actions performed by certain actuators, machines, or components within the system 116 or outside the system 116. The manipulated variable disturbance data 118 may include any suitable variable that may cause one or more operational characteristics (e.g., speed, efficiency, power usage, heat dissipation, product consistency, error rate) of the system 116 to change. As such, the commands provided to the system 116 and the manipulated variable disturbance data may both affect the operational characteristics of the system 116. In this way, the commands provided to the system 116 by the PID controller 114 may not adequately cause the system 116 to converge to an operational state that corresponds to the set point 112.

In any case, the system 116 may provide system output data 120 that may include data acquired from the sensors 16, operational characteristics measured by the industrial automation devices 20, or the like. The system output data 120 may represent a current operational state of the system 116. The system output data 120 may, however, also include noise or controlled variable disturbance data 122. Noise data may include any suitable sources of noise including electromagnetic interferences, ambient temperature fluctuations, and other noise elements that may cause the system output data 120 to change.

In some embodiments, the commands output by the PID controller 114, the manipulated variable disturbance data 118, and the system output data 120 may be provided to a tuning component 124. The tuning component 124 may be implemented via hardware, software, or both using a controller, a control system, a computing device, or the like. The tuning component 124 may generate a model representative of the operational characteristics or the system output data 120 of the system 116 as a function of the commands output by the PID controller 114 and the manipulated variable disturbance data 118. As such, the tuning component may generate the model of the system 116 based on normal or continuous operation data of the system 116. Using the generated model, the tuning component may determine PID parameters 126 that may enable the PID controller 114 to output commands that cause the system 116 to converge to the set point 112 more efficiently.

By way of example, it should be noted that processes performed by the system 116 are often impacted due to changes related to multiple variables, as opposed to a single variable. As such, in some embodiments, the tuning component 124 may analyze the changes in the system output data 120 using a Bayesian optimization algorithm. That is, the tuning component 124 may analyze the changes in the system output data 120 using the Bayesian optimization algorithm to identify process changes, upsets, disturbances, and other features that may relate to certain correlations between one or more variables and the system output data 120. That is, since the objective function related to the correlation of the input variables and the system output data 120 is unknown, the tuning component 124 may treat the behavior of the system 116 as a random function and place a prior probability distribution of an uncertain quantity related to the behavior of the system 116.

By using the Bayesian optimization algorithm, the tuning component 124 may identify a portion of the collected data that has the lowest (e.g., less than some threshold) uncertainty quantity related to the relationship between the one or more variables and the system output data 120. As such, the tuning component 124 may perform a "smart data selection" operation to identify the data that contains information with correlations that may be used to generate a model of the system 116. For instance, in a water treatment facility, the Bayesian optimization algorithm may identify a certain period of time (e.g., operational schedule) in which wastewater is provided during the day, while the remaining period of time the water treatment facility operates using water harvested from rain. The wastewater time period may correspond to a number of manipulated variable changes that cause the associated system 116 to react in various ways. These reactions may provide more insight into the behavior of the system 116 as opposed to the time period in which the water treatment facility receives rainwater.

If the tuning component 124 does not identify a time period in which correlations between input variables and output variables can be identified within some threshold of confidence (e.g., standard deviation threshold of uncertainty), the tuning component 124 may send some excitation 128 to the system 116. The excitation may include modifying one or more of the manipulated variables, such that the system 116 may induce some response or reaction that may be used to identify a correlation, which may be used to generate the model. That is, the excitation may create a time period that the tuning component may characterize as data rich because it includes some detectable correlation between input parameters and the system output data 120.

In some embodiments, after identifying the information rich time period, the tuning component 124 may generate a model that represents the performance of the system 116 in view of the manipulated variable disturbance data 118, the commands issued by the PID controller 114, and the like. The model may be any suitable model that characterizes the expected system output data 120 given the various inputs received by the system 116.

By way of example, the tuning component 124 may consider two factors in defining the information-rich time period. The first factor may include whether a variable of interest (e.g., a manipulated variable such as the speed of mixer in a mixing process) is changing more than a threshold amount to offer the possibility of meaningful information extraction (e.g., measurable changes in system output data 120). This property is referred to as "persistent excitation." Some mathematical definitions for this property may be based on the calculation of different autocorrelations for the signal with its shifted (e.g., delayed) version and identifying if a symmetric matrix formed by these autocorrelations is of full rank or not. The tuning component 124 may include an automated calculation of this metric as part of an AI engine function.

The second factor that may be part of determining whether the data is information-rich may include determining whether the variable that is determined to have persistent excitation does in fact impact the target variable of interest (e.g., system output data 120). In one example, a mixer's speed should have more than a threshold amount of variation to be able to introduce information into the operation data (i.e., be persistently exciting). However, if the mixer's speed excitation does not impact the variable of interest (e.g., the viscosity of the mix) in a discernable way (e.g., more than some threshold), then the tuning component 124 may determine that the data is not informative. In mathematical terms, this impact may be measured in many ways, such as "mutual information."

With this in mind, the tuning component 124 may also determine whether the data is informative or not based on a determination that the mutual information is "authentic." Referring again to the example above, if the tuning component 124 detects another variable that is changing while the mixer speed was changing, this additional variable may corrupt the calculation of mutual information between mixer speed and the viscosity of the mix. As such, the tuning component 124 may use a combination of "excitation overlap" and "prior process knowledge" to authenticate this discovery.

Based on the identified model and the current operating state of the system 116, the tuning component 124 may generate the PID parameters 126 that adjust the operations or function of the PID controller 114. The PID parameters 126 may correspond to coefficients used by the PID controller 114 to implement the PID algorithm as described above with respect to FIGS. 4 and 5. The PID parameters 126 may tune the PID controller 114 to react to changes in the system 116 more quickly and cause the system 116 to achieve a desired state related to the set point 112 more efficiently. In other words, the tuned PID controller 114 may cause the system 116 to converge to a desired state more efficiently and thus increase productivity of the system 116. Additional details with regard to the operations of the tuning component 124 is described below with respect to FIG. 7.

Figure 7:
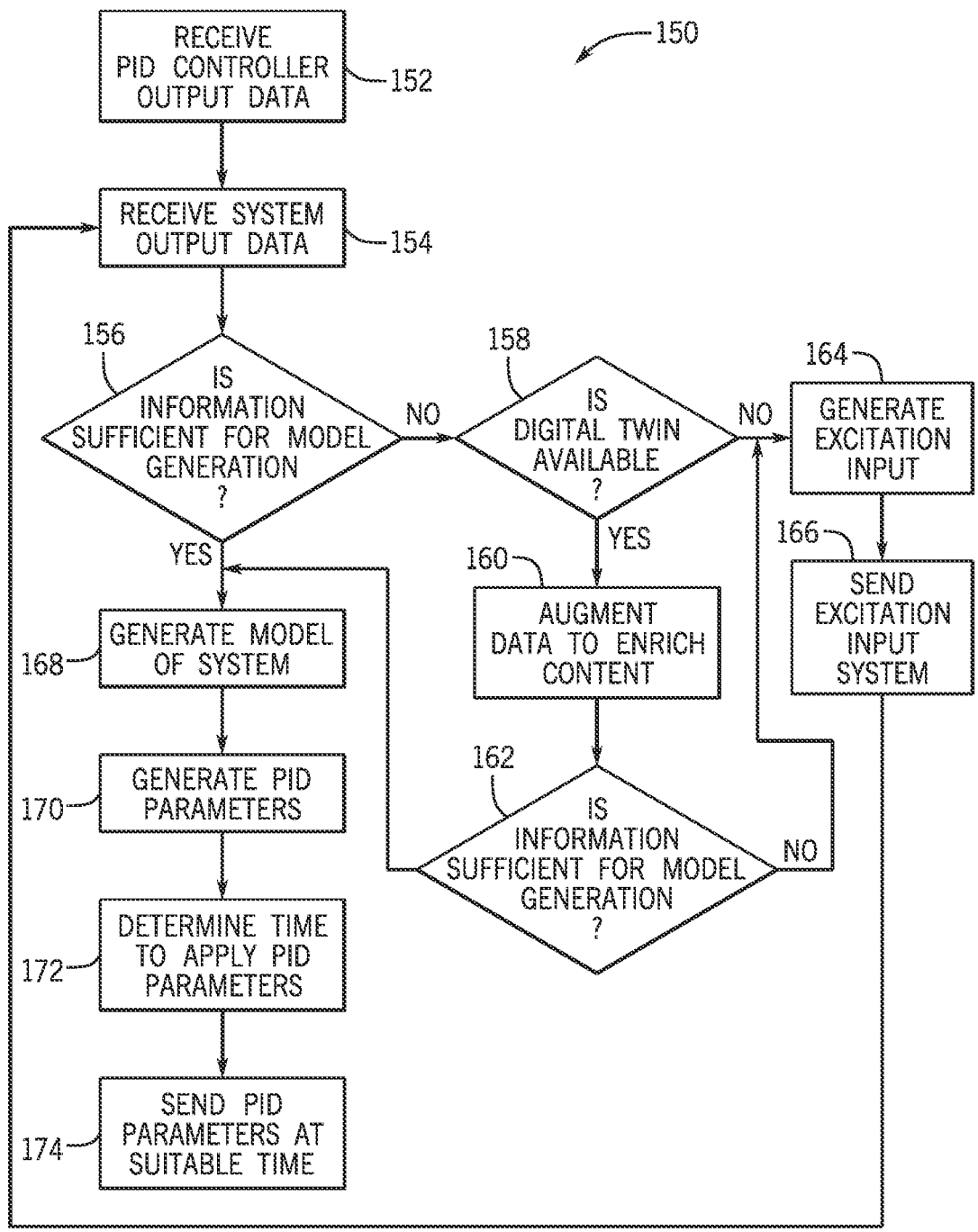
FIG. 7 illustrates an example flow chart of a method for generating an initial model of a system and tuning parameters of a PID controller, in accordance with an embodiment.

FIG. 7 illustrates a flow chart of a method 150 for generating parameters of the model-less controller or the PID controller 114 of FIG. 6, in accordance with embodiments described herein. Although the following description of the method 150 is detailed as being performed by the tuning component 124, it should be noted that the method 150 may be performed by any suitable controller, control system, or computing device. In addition, although the method 150 is described in a particular order, it should be understood that the method 150 may be implemented in any suitable order.

Referring now to FIG. 7, at block 152, the tuning component 124 may receive output data from the PID controller 114. As discussed above, the PID controller output data may include commands designated for one or more industrial automation devices 20 of the system 116. The commands are designed to cause the system 116 to converge or move to a desired state that corresponds to the set point 112.

At block 154, the tuning component 124 may receive system output data 120, which may include responses, sensed data, measured data, operational states, or any other suitable property associated with an output of the system

116. Based on the PID controller output data and the system output data, the tuning component 124 may analyze the operational data associated with the system 116 in real time. As such, in some embodiments, the tuning component 124 may determine an operational mode (e.g., continuous, heavy load, light load) being executed by the system 116.

At block 156, the tuning component 124 may also analyzed data to determine whether information present in the data received at blocks 152 and 154 are sufficient for generating a model for the system 116. The tuning component 124 may evaluate the received data to determine whether a threshold number of correlations may be gleaned or tracked between the input data and the output data. That is, if the input data and the output data does not change during a period of time, the tuning component 124 may not be able to identify any relationships between the input data and the output data. In the same manner, if the one or more input variables (e.g., manipulated variables) change over a period of time and the output data does not change, the tuning component 124 may again be unable to identify any relationship between the input data and the output data. Conversely, if the input data changes and is associated with changes in the output data, the tuning component 124 may identify certain correlations that may be used to generate a model of the system 116.

As discussed above, the determination of the information-rich period may be conducted in a number of ways. In some embodiments, the techniques described above may be integrated with an artificial intelligence (AI) engine with the tuning component 124 to inform and guide the process of discovering "information-rich data." For example, controller programs (e.g., Ladder Logic in Rockwell Automation's ControlLogix) may include accurate information on any actions that impact the process of interest. Through connection to related programmable logic control (PLC) code, the tuning component may provide the AI engine with the accurate and real-time context for the data that is measured. This context may assist in the determination of the "information-worthiness" of the data. For example, if the controller program indicates that a certain variable should remain constant, but the actual measurement reflects variation in that variable then the data can be flagged for further input from the operation to ensure that, for example, a sensor failure is not the source of recorded variations.

If the information is not sufficient to generate a model of the system 116, the tuning component 124 may proceed to block 158 and determine whether a digital twin or simulation of the system 116 is available. In some embodiments, the tuning component 124 may be communicatively coupled to a storage component (e.g., memory, hard drive, database), a computing device, or some other component that may host a digital twin of the system 116. The digital twin of the system 116 may be a digital simulation or representation of the system 116. As such, the digital twin may be composed of individual components that collectively interact with each other in the same manner as the system 116.

When tuning coupled multi-loop PID controllers, closed loop data alone is not sufficient to uniquely determine individual loop models. As such, simulation models, such as the digital twin, may be used to separate the impact of the inputs in closed loop multiple-input multiple-output (MIMO) data. The digital twin may then receive live input data and may produce an output that may be used for either monitoring, anomaly detection, or for modification of the simulation model. In some embodiments, the digital twin or simulation model may be executed by a separate computing device or cloud system that may be accessible to the tuning component 124. In this architecture, the flow of the data from the tuning component 124 to server/cloud and the return of information to the tuning component 124 may involve encryption/authentication for security reasons.

If the digital twin of the system 116 is available, the tuning component 124 may proceed to block 160 and augment data within the digital twin to enrich the content. The tuning component 124 may augment the digital twin by changing a condition or input parameter that the digital twin is currently simulating. The tuning component 124 may then proceed to block 162 and determine whether the augmented data generated a response from the digital twin of the system 116 that may enable the tuning component 124 to generate a model for controlling the system 116. As such, the tuning component 124 may evaluate the response of the system 116 with respect to the modified manipulated variables that correspond to the augmented data. The analysis performed by the tuning component 124 at block 162 may correspond to the analysis performed at block 156.

If the information at block 162 is not sufficient to generate a model of the behavior of the system 116 in response to the changes in input data, the tuning component 124 may proceed to block 164. At block 164, the tuning component 124 may generate an excitation input that may be provided to the system 116. The excitation input may correspond to induce one or more minimal excitations input signals that may be provided to the system 116 to enrich the information content of the data while ensuring that the system 116 stays within acceptable bounds for production. The excitation input signals may include any change to any suitable manipulated variable or other variable that the system 116 may receive as an input. By way of example, the tuning component 124 may use excitation input signals such as Pseudo Random Binary Sequence (PRBS) and provide carefully crafted step changes. That is, the tuning component 124 may use step changes in processes with long settling time to avoid undue disturbance to the system 116. With the forgoing in mind, the use of Bayesian optimization by the tuning component may ensure that the tuning component 124 identify a minimum number of variables to be excited to generate reliable models.

In some embodiments, the tuning component 124 may generate an optimal excitation to enrich data to more accurately generate or identify the model of the system 116. The optimal excitation may include an excitation input that produces a detectable change in the system output data 120 while allowing the system 116 to continue operating within certain operating bounds (e.g., speed, operational efficiency, power consumption). To identify the optimal excitation, the tuning component 124 may employ a constrained Bayesian optimization algorithm to determine an excitation signal to provide the system 116 to cause the system 116 to generate maximal new information. As such, the tuning component 124 may use statistical information in the data and the confidence in the model to identify variables that can be excited and a magnitude or level in which the variables should be excited. The tuning component 124 may constrain the application of the Bayesian optimization algorithms based on physical constraints of the system 116 with respect to certain excitation signals. It is possible that the necessary excitation level for creating informative data would push the process out of an acceptable operation zone of the system 116. In such a case, the constrained Bayesian optimization algorithm may cause the tuning component 124 to generate a flag to indicate that manual intervention may be recommended or that the tuning component is unable to generate a meaningful excitation. As a result, the tuning component 124 may ensure that the induced excitation does not lead to unacceptable operation regime by the system 116.

In the absence of the systematic Bayesian optimization described herein, excitation signals may be based on heuristic or domain expertise. These excitations are time consuming and may result in measurable waste (e.g., energy, additional control action to compensate for the induced excitation, etc.). As such, optimizing the excitation strategy as described in the embodiments herein may result in significant operational savings, especially if the time/cost to execute these excitations is high.

After generating the excitation input signals, at block 166, the tuning component 124 may send the excitation input signal to the system 116. The tuning component 124 may then return to block 154 and receive the system output data 120. The tuning component 124 may then resume the method 150.

Referring briefly back to block 158, if the tuning component 124 does not determine that a digital twin of the system 116 is available, the tuning component 124 may proceed to block 164. As such, in the absence of a digital twin, the tuning component 124 may generate an excitation input signal as described above.

Referring now back to blocks 156 and 162, after the tuning component 124 determines that the information is sufficient for generating a model for the system 116, the tuning component 124 may proceed to block 168. At block 168, the tuning component 124 may generate a model of the system 116 based on the reaction of the system 116 in view of the PID controller output data, the system output data 120, or other input data changes. In some embodiments, the tuning component 124 may identify a suitable model that represents the response of the system 116 in view of the excitation signal.

Model generation, referred to as "System Identification," may be part of an AI-driven tuning of the PID controller 114. In some embodiments, the tuning component 124 may use a closed-loop system identification algorithm. As referred herein, a closed loop may refer to a controller (e.g., the PID controller) that remains in place and therefore there is an inherent correlation due to controller action that the identification algorithm should overcome. The tuning component may thus include an integrated closed-loop system ID with an AI engine so that the identification in closed loop is possible for multi-input multi output (MIMO) systems, thereby providing reliable results.

In some embodiments, the tuning component 124 may monitor the consistency of the models built against various upset conditions. That is, the tuning component 124 may use cross-validation operations to ensure the robustness of the model. In some embodiments, the tuning component 124 may utilize an inherent randomness in how disturbances impact the process implemented by the system 116 as an opportunity to cross validate the model across different times and process variations. The tuning component 124 may then select a model that is most consistent against variations.

After generating the model of the system 116, the tuning component 124 may proceed to block 170 and generate PID parameters 126 to improve the performance of the PID controller 114. In some embodiments, the tuning component may use a robust multi-objective optimization strategy to determine the PID parameters 126 associated with the coupled MIMO PID loops through systematic optimization. For example, the tuning component 124 may consider three terms considered in an objective function for determining the PID parameters 126. The terms may include (a) a transfer function between an input set point 112 to error (e.g., set point—process variable or system output data 120) and may be concerned with the ability to track the set point 112; (b) a transfer function between reference input set point 112 and a control variable or the PID controller output data that may be concerned with a cost/size of the control action; and (c) a transfer function between process disturbances to the process output (e.g., noise/control variable disturbance 122) that may be concerned with disturbance rejection. Simultaneous consideration of these three terms may enable the tuning component 124 to provide a robust tuning strategy that eliminates the need for trial and error. That is, by employing the techniques described herein, the tuning component 124 may provide automated online tuning of the PID controllers by selecting the tuning parameters as a result of the analysis of the operation data to properly set the parameters as it pertains to current operating condition of the system 116.

The tuning component 124 may employ a variety of methodologies to determine the PID parameters 126. For example, the tuning component 124 may employ tuning algorithms that rely on heuristic processes and may involve some degree of trial and error. With this in mind, the tuning component 124 may use an optimization-based approach to the tuning of the PID coefficients. In particular, the tuning component 124 may use the connectivity to the PID controller 114 to determine whether the output of the optimization is reliably robust to be deployed online. As such, the tuning component 124 may perform parallel simulations against various process models to examine whether the identified tuning is robust across various operation regions. Also, the tuning component 124 may use the AI engine to properly schedule transition from current tuning of the system 116 to the newly determined optimal tuning.

It should be noted that the tuning component 124 may avoid creating disturbances in the system 116 due to changes in PID parameters 126 or coefficients. If done without proper provisions, changing PID coefficients could trigger transient responses in the system 116 that may result in interruptions in operation (e.g., tripping protective relays because of current excursions). As such, at block 172, the tuning component 124 may determine a time to apply the PID parameters 126 to the PID controller 114. That is, the tuning component 124 may use automated analysis of the data to determine a time period in which a change in the PID parameters 126 (e.g., coefficients) may result in minimum transient response (e.g., changing the proportional gain when the tracking error is near zero which makes contributions of the change in P coefficient insignificant).

After determining the suitable time period, the tuning component 124 may, at block 174, send the PID parameters 126 to the PID controller 114 at the suitable time. That is, the tuning component 124 may modify the PID parameters 126 of the PID controller 114 during a time period in which the system 116 may be minimally affected due to the current operational state of the system 116. However, after the PID parameters 126 are updated in the PID controller 114, the PID controller 114 may control the system 116 more effectively by converging to a desired state that corresponds to the set point 112 more efficiently, as compared to using the previous PID parameters. Moreover, the PID controller 114 may be better suited to adapt to changes in the system output data 120 due to changes int eh manipulated variable disturbance data 118, the noise or controlled variable disturbance data 122, or the like.

It should be noted that that the different components of the block diagram shown in FIG. 6 may be deployed in different environments. For example, while the tuning component 124 may be hosted on an edge device (e.g., Rockwell Automation's VersaView 6300), the digital twin may be hosted by a server or in a cloud under proper communication security protocols. Moreover, as mentioned above, the PID controller 114 may be embedded in a programmable logic controller (PLC) (e.g., Rockwell Automation's ControlLogix), on an edge device, and the like. Moreover, it is also possible to run different portions of the method 150 in different cores of a single multi-core processor.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the embodiments described herein have been illustrated and described, many modifications and changes will occur to those skilled in the art. It is, therefore, to be understood that the appended claims are intended to cover all such modifications and changes as fall within the true spirit of the embodiments described herein.

The invention claimed is:

1. A non-transitory computer-readable medium comprising computer-executable instructions that, when executed, are configured to cause a processor to perform operations comprising:
   receiving data representative of:
     one or more commands generated by a model-less controller to control one or more operations of one or more devices within a system; and
     one or more output parameters associated with the one or more devices of the system;
   determining whether the data is indicative of a change in one or more operational characteristics of the system;
   generating a model representative of the one or more operational characteristics of the system as a function of the data based on a Bayesian optimization algorithm in response to the data being indicative of the change;
   determining an excitation input based on the Bayesian optimization algorithm in response to the data not being indicative of the change, wherein the excitation input is configured to induce the change in the one or more operational characteristics within a threshold range by adjusting at least a first subset of the data;
   after determining the excitation input:
     transmitting the excitation input to the one or more devices;
     after transmitting the excitation input, identifying a time period corresponding to:
       when a second subset of the data is outside a second threshold range; and
       when a variation in the second subset of the data exceeds a variation threshold;
     receiving one or more updated output parameters associated with the one or more devices of the system during the time period;
     generating the model based on the one or more updated output parameters received during the time period and the excitation input;
   generating one or more model-less control parameters associated with the model-less controller based on the model; and
   transmitting the one or more model-less control parameters to the model-less controller, wherein the model-less control is augmented based on the one or more model-less control parameters, wherein the model-less controller is configured to control the one or more devices based on the one or more model-less control parameters to converge the system to a desired state.

2. The non-transitory computer-readable medium of claim 1, wherein the data is representative of manipulated variable disturbance associated with the one or more operational characteristics of the system.

3. The non-transitory computer-readable medium of claim 1, wherein the computer-executable instructions that, when executed, are configured to cause the processor to perform the operations comprising:
   augmenting a dataset associated with a digital twin representative of the one or more operational characteristics of the system in response to the data not being indicative of the change; and
   generating the model representative of the one or more operational characteristics of the system as a function of additional data acquired from the digital twin based on the Bayesian optimization algorithm.

4. The non-transitory computer-readable medium of claim 1, wherein the one or more model-less control parameters are configured to cause the model-less controller to generate one or more additional commands configured to cause the system to more efficiently converge to a set point received by the model-less controller as compared to one or more additional parameters previously employed by the model-less controller.

5. The non-transitory computer-readable medium of claim 1, wherein the computer-executable instructions that, when executed, are configured to cause the processor to perform the operations comprising:
   identifying a time period to transmit the one or more model-less control parameters to the model-less controller based on an operation schedule associated with the system; and
   transmitting the one or more model-less control parameters to the model-less controller during the time period.

6. The non-transitory computer-readable medium of claim 1, wherein the model-less controller comprises a proportional-integral-derivative (PID) controller.

7. A method, comprising:
   receiving, via at least one processor, data comprising:
     one or more commands generated by a model-less controller to control one or more operations of one or more devices within a system; and
     one or more output parameters associated with the one or more devices of the system;
   determining, via the at least one processor, whether the data is indicative of a change in one or more operational characteristics of the system;
   generating a model representative of the one or more operational characteristics of the system as a function of the data based on a Bayesian optimization algorithm in response to the data being indicative of the change;
   determining an excitation input based on the Bayesian optimization algorithm in response to the data not being indicative of the change, wherein the excitation input is configured to induce the change in the one or more operational characteristics within a threshold range by adjusting at least a first subset of the data;

after determining the excitation input:
   transmitting the excitation input to the one or more devices;
   after transmitting the excitation input, identifying a time period corresponding to:
      when a second subset of the data is outside a second threshold range; and
      when a variation in the second subset of the data exceeds a variation threshold;
   receiving one or more updated output parameters associated with the one or more devices of the system during the time period;
   generating the model based on the one or more updated output parameters received during the time period and the excitation input
   generating one or more model-less parameters associated with the model-less controller based on the model; and
   transmitting the one or more model-less control parameters to the model-less controller, wherein the model-less control is augmented based on the one or more model-less control parameters, wherein the model-less controller is configured to control the one or more devices based on the one or more model-less control parameters to converge the system to a desired state.

8. The method of claim 7, wherein the data comprises manipulated variable disturbance associated with the one or more operational characteristics of the system.

9. The method of claim 7, wherein the one or more output parameters are affected by one or noise signals, one or more controlled variable disturbances, or both.

10. The method of claim 7, comprising:
augmenting a dataset associated with a digital twin representative of the one or more operational characteristics of the system in response to the data not being indicative of the change; and
generating the model representative of the one or more operational characteristics of the system as a function of additional data acquired from the digital twin based on the Bayesian optimization algorithm.

11. The method of claim 7, wherein the one or more model-less control parameters are configured to cause the model-less controller to generate one or more additional commands configured to cause the system to more efficiently converge to a set point received by the model-less controller as compared to one or more additional parameters previously employed by the model-less controller.

12. The method of claim 7, comprising:
identifying a time period to transmit the one or more model-less control parameters to the model-less controller based on an operation schedule associated with the system; and
transmitting the one or more model-less control parameters to the model-less controller during the time period.

13. The method of claim 7, wherein the model-less controller comprises a proportional-integral-derivative (PID) controller.

14. A control system comprising one or more processors configured to perform operations comprising:
receiving data representative of:
   one or more commands generated by a model-less controller to control one or more operations of one or more devices within a system; and
   one or more output parameters associated with the one or more devices of the system;
determining whether the data is indicative of a change in one or more operational characteristics of the system;
generating a model representative of the one or more operational characteristics of the system as a function of the data based on a Bayesian optimization algorithm in response to the data being indicative of the change;
determining an excitation input based on the Bayesian optimization algorithm in response to the data not being indicative of the change, wherein the excitation input is configured to induce the change in the one or more operational characteristics within a threshold range by adjusting at least a first subset of the data;
after determining the excitation input:
   transmitting the excitation input to the one or more devices;
   after transmitting the excitation input, identifying a time period corresponding to:
      when a second subset of the data is outside a second threshold range; and
      when a variation in the second subset of the data exceeds a variation threshold;
   receiving one or more updated output parameters associated with the one or more devices of the system during the time period;
   generating the model based on the one or more updated output parameters received during the time period and the excitation input
   generating one or more model-less control parameters associated with the model-less controller based on the model; and
   transmitting the one or more model-less control parameters to the model-less controller, wherein the model-less control is augmented based on the one or more model-less control parameters, and wherein the model-less controller is configured to control the one or more devices based on the one or more model-less control parameters to converge the system to a desired state.

15. The control system of claim 14, wherein the model is generated based on identifying a portion of the data associated with an uncertainty level that is less than a threshold, wherein the uncertainty level is determined based on the Bayesian optimization algorithm.

16. The control system of claim 14, wherein the one or more processors are configured to determine whether the data is indicative of the change in one or more operational characteristics of the system based on identifying a correlation between one or more input variable of the system and one or more output variables of the system.

17. The control system of claim 16, wherein the one or more processors are configured to perform the operations comprising:
identifying a time period to transmit the one or more model-less control parameters to the model-less controller based on an operation schedule associated with the system; and
transmitting the one or more model-less control parameters to the model-less controller during the time period.

* * * * *